(12) United States Patent
Koike

(10) Patent No.: US 8,313,272 B2
(45) Date of Patent: Nov. 20, 2012

(54) DEVICES FOR LOGISTICS OF WIND ROTOR BLADES

(75) Inventor: Bento Massahiko Koike, São Paulo (BR)

(73) Assignee: TECSIS Technologia E Sistemas Avançados Ltda, Sorocaba (BR)

( * ) Notice: Subject to any disclaimer, the term of this patent is extended or adjusted under 35 U.S.C. 154(b) by 709 days.

(21) Appl. No.: 11/721,324

(22) PCT Filed: Dec. 9, 2005

(86) PCT No.: PCT/IB2005/054164
§ 371 (c)(1),
(2), (4) Date: Feb. 14, 2008

(87) PCT Pub. No.: WO2006/061806
PCT Pub. Date: Jun. 15, 2006

(65) Prior Publication Data
US 2009/0020445 A1    Jan. 22, 2009

(30) Foreign Application Priority Data

Dec. 10, 2004 (BR) ............... PI0405546-2
Jul. 8, 2005 (BR) ............... C10405546-2

(51) Int. Cl.
*B61D 3/16* (2006.01)

(52) U.S. Cl. ...................................... 410/44

(58) Field of Classification Search .......... 410/53, 410/120, 44, 45, 34, 82, 2, 35, 36, 46, 47, 410/101
See application file for complete search history.

(56) References Cited

U.S. PATENT DOCUMENTS

| | | | | |
|---|---|---|---|---|
| 4,341,494 A | * | 7/1982 | Fedele | 410/45 |
| 4,365,919 A | * | 12/1982 | Mehki | 410/120 |
| 5,271,499 A | * | 12/1993 | Van Horssen | 206/335 |
| 5,628,403 A | * | 5/1997 | Thomas et al. | 206/523 |
| 2003/0175089 A1 | * | 9/2003 | Almind | 410/2 |
| 2004/0091346 A1 | | 5/2004 | Wobben | |
| 2004/0217037 A1 | | 11/2004 | O'Kane et al. | |
| 2005/0031431 A1 | | 2/2005 | Wobben | |
| 2005/0180833 A1 | * | 8/2005 | Almind | 410/2 |
| 2005/0258064 A1 | | 11/2005 | Wobben | |
| 2006/0251517 A1 | | 11/2006 | Grabau | |

FOREIGN PATENT DOCUMENTS

| | | |
|---|---|---|
| GB | 2 177 375 A | 1/1987 |
| WO | WO 02/083523 A | 10/2002 |
| WO | WO 03/076307 A | 9/2003 |
| WO | WO 2005/005286 A | 1/2005 |
| WO | WO 2006/000230 A1 | 1/2006 |
| WO | WO 2006/053931 A | 5/2006 |

OTHER PUBLICATIONS

The Transport Game, VestasGlobal, No. 05, Year 03, Apr. 2006, p. 12-17, Vestas Wind Systems A/S. www.vestas.com.

* cited by examiner

*Primary Examiner* — Glenn Dayoan
*Assistant Examiner* — Sunsurraye Westbrook
(74) *Attorney, Agent, or Firm* — Sughrue Mion, PLLC

(57) ABSTRACT

The present invention consists of a packing device for logistics of groups of wind turbine rotor blades, preferably of pairs of blades, including at least two structures, each one having a peripheral frame. For guaranteeing the proper conditions for the logistics, said blades are supported and fastened to the structures by flexible belts stressed by ratchets, being said blade profile partially or entirely enveloped by said flexible belts. And alternatively, the device for logistics of groups of wind turbine rotor blades may include tip protection cover, blades fastening device, such as belts, ropes or chains, and protecting devices on areas of contact between the blades to prevent the friction.

12 Claims, 7 Drawing Sheets

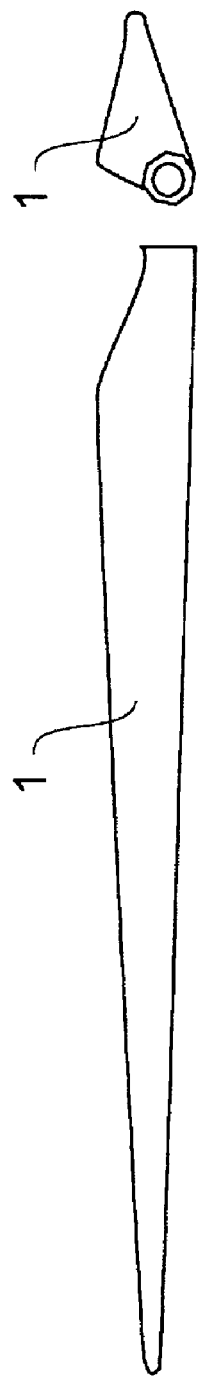
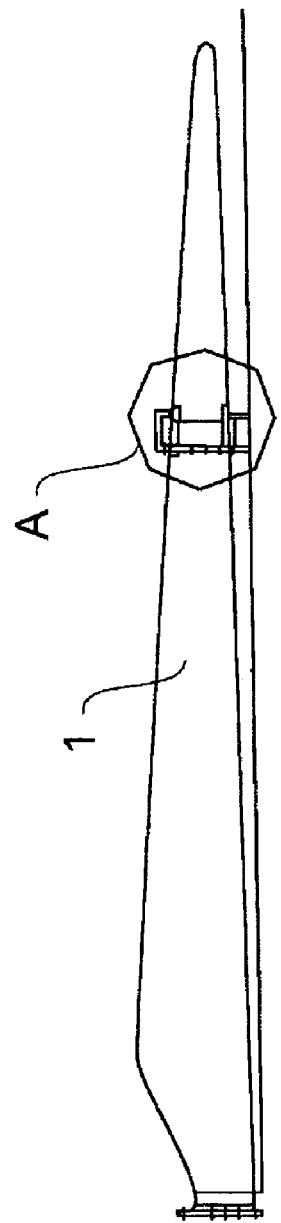
Fig. 1
Fig. 2
Fig. 3

DEVICES FOR LOGISTICS OF WIND ROTOR BLADES

TECHNICAL FIELD

The present invention relates to packing elements specially adapted for rotor blades, in particular wind turbine rotor blades, in order to guarantee the integrity of the blades, more particularly of the blade tip.

BACKGROUND ART

The production of electricity by wind energy has been considered as one of the technological alternatives in faster development in the world.

As operational cost falls and environment-related concerns grow, more and more countries are choosing non-pollutant, renewable power plants.

The wind energy, in particular, is generated by large wind generators comprising a vertical structure on whose top is placed at least one horizontal axis wind turbine, which can be composed by one, two, three or multiple blades.

Currently, there is an increasing world-wide trend of installing this type of power plant by governmental programs. This way, organizations, industry and service companies assume each time more interest in the wind energy as an attractive investment as well as a solution for the energy issues in the future.

However, the wind turbine rotor blades have large dimensions and peculiar geometry, demanding special conditions for logistics, which may include steps such as handling, transporting and storing said blades. Furthermore, those conditions must provide protection and costs reduction besides complying with international transportation regulations.

In the background art, there are many devices developed aiming at satisfactorily solving the mentioned problems of the wind turbine rotor blades logistics viability due to their singular geometry.

For example, International Publication no WO02083523A1 relates to a transportation method and a package system for transporting a set of large longitudinal items such as blades for wind turbine or a tower for a wind turbine. When transporting wind turbine blades, a tip of one blade and a root of a second blade are packed together The International Publication no WO03076307A1 describes a modular extendable container system for transporting wind turbine rotor blades, being the root portion of each blade connected to a respective outer most end portion of the container or, alternatively, a single blade accommodated.

DISCLOSURE OF INVENTION

Technical Problem

However the solutions provided by the cited documents and others in the prior art do not solve suitably and efficiently many problems in the technical field of packing elements specially adapted for rotor blades, in particular wind turbine rotor blades, for logistics, including handling, transporting and storing.

For instance, the devices described in documents WO02083523A1 and WO03076307A1 provides large containers demanding larger rooms in the final configuration of the modules. Besides, using closed side-walls in the support structure increases the total cost for the logistics due to the quantity of material and tools needed to the package manufacture and also due to the higher weight of the set of packing devices.

Therefore, there is still the seek for a set of packing devices specially adapted for rotor blades for logistics, including handling, transporting and storing, which propitiates a set of structures with reduced dimensions, weight and cost, associating the important features of flexibility and the integrity of the blades.

Furthermore, the set must provide a support structure compatible with standard equipments such as trucks and cranes and must allow the transportation of loads bigger than, for example, the truck.

Technical Solution

The object of the present invention is to provide a simplified packing device for handling, transporting and storing wind turbine rotor blades that, besides reducing transport costs, allows the logistics of groups of wind turbine rotor blade, preferably pairs of blades, without harming the blades integrity, in particular the blade tip.

Another object of the present invention is to provide a set of packing structures, for storing and supporting wind turbine rotor blades, that reduces the final costs of blades transportation, storing and handling, by compacting and associating of one or more blades in only one set of structures, preferably being said set of packing structures with rectangular cross-section which propitiates better accommodation and stacking.

Another object of the present invention is to provide a set of packing structures, for handling, transporting and storing wind turbine rotor blades, that permits a faster delivery of said blades.

Furthermore, another object of the present invention is to provide a set of packing structures, for handling, transporting and storing wind generator blades, that complies with commercial and international technical norms.

To achieve those cited objects and other purposes, the present invention consists of a packing device for logistics, which may include steps such as handling, transporting and storing, of groups of wind turbine rotor blades, preferably of pairs of blades. The packing device for logistics of wind turbine rotor blades includes at least two structures, each one having a peripheral frame. Preferably, said structures may be connected by a middle structure provided with handling points positioned in such a manner to enable the use of standard transportation equipment.

Furthermore, in the inner part of the structure is a set of anchor arms, being preferably at least one of said anchor arms fixed and the others anchor arms removable or rotatable on peripheral frame. For guaranteeing the proper conditions for logistics of said blades, they are supported and fastened to the structures by flexible bells stressed by ratchets, being said blade profile partially or entirely enveloped by said flexible belts.

Additionally, on the peripheral frame are disposed upper guides and under guides; being the shapes of said upper guides complementary to the shape of said under guides and being under guides of a set of packing structures of a first group of blades matched to upper guides of a set of packing structures of another group of blades facilitating the stowage operation.

Alternatively, the device for logistics of groups of wind turbine rotor blades, preferably pairs of blades, may include tip protection cover, blades fastening device, such as belts, ropes or chains, and protecting devices on areas of contact between the blades to prevent friction.

Advantageous Effects

The use of a tip protection cover and a blades fastening device, such as belts, ropes or chains, involving both blades, besides guaranteeing the integrity, results in a better fixation of the blades, minimizing vibration on the blade tip.

Additionally, the protection provided on the areas of contact between the two blades prevents the friction between them during handling or transporting.

The present invention is especially advantageous because the described device is conveniently adjusted for standard transportation, such as trucks and ships, and handling, such as cranes. Such advantage is due to the minimization of the vibration on the blade tip by the tip protection cover and by the fixation to the root of the other blade by the blades fastening device, dispensing the use of an additional wagon for support the entire group of blades. Therefore, a smaller truck may be adopted, being the tip and root connected by the described tip protection cover, blades fastening device and protecting devices on areas of contact between the two blades, and in swing outside the truck rear, however completely safe and protected.

DESCRIPTION OF DRAWINGS

The object of the invention becomes perfectly understood in the following description with references to the indicative numerals in accompanying drawings, evidencing its main characteristics, as follows:

FIG. 1—shows a lateral view of conventional wind turbine rotor blades as known from the background art.

FIG. 2—shows a perspective view of conventional wind turbine rotor blades as known from the background art.

FIG. 3—shows conventional transportation packing of wind turbine rotor blades as known from the background art.

MODE FOR INVENTION

Figure 4:
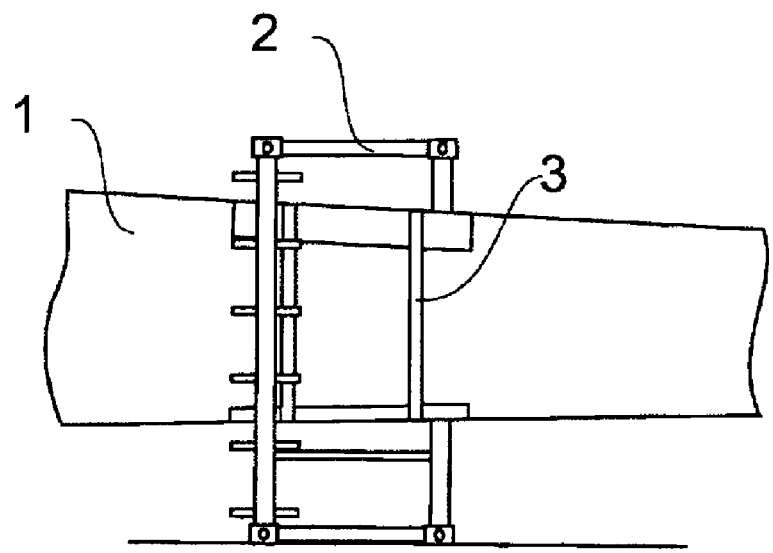
FIG. 4—shows detail 'A' from FIG. 3.

According to cited illustrations the singular dimension and geometry of a conventional wind turbine rotor blade (1) are represented in FIGS. 1 and 2, showing the need for special conditions for handling, transporting and storing as exemplified in FIG. 3 by a configuration known from the background art. This configuration complies with the international requirements for land or sea transportation, however accommodating only one blade (1). Additionally, in FIG. 4 an amplification of detail A is represented, emphasizing the use of a fixed and rigid structure (2) for supporting the blade (1) and fastening belts (3) weight.

Figure 5:
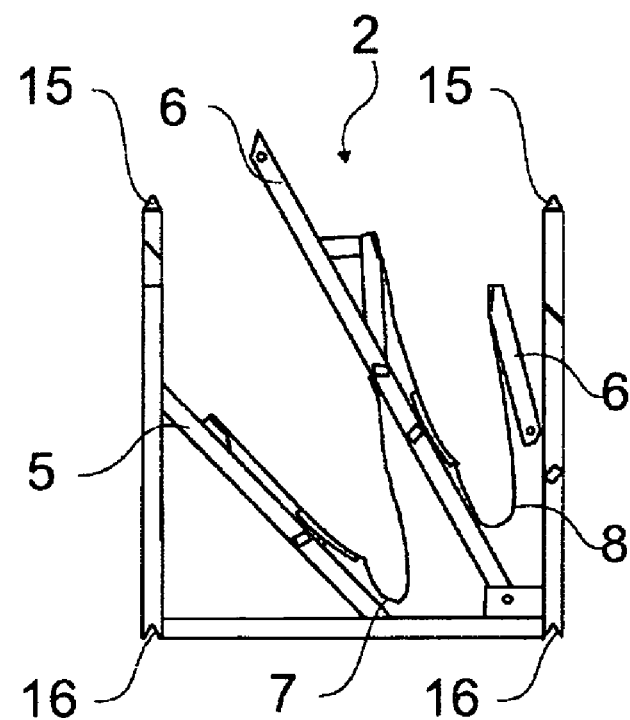
FIG. 5—shows a frontal view of the packing structure for logistics.
Figure 6:
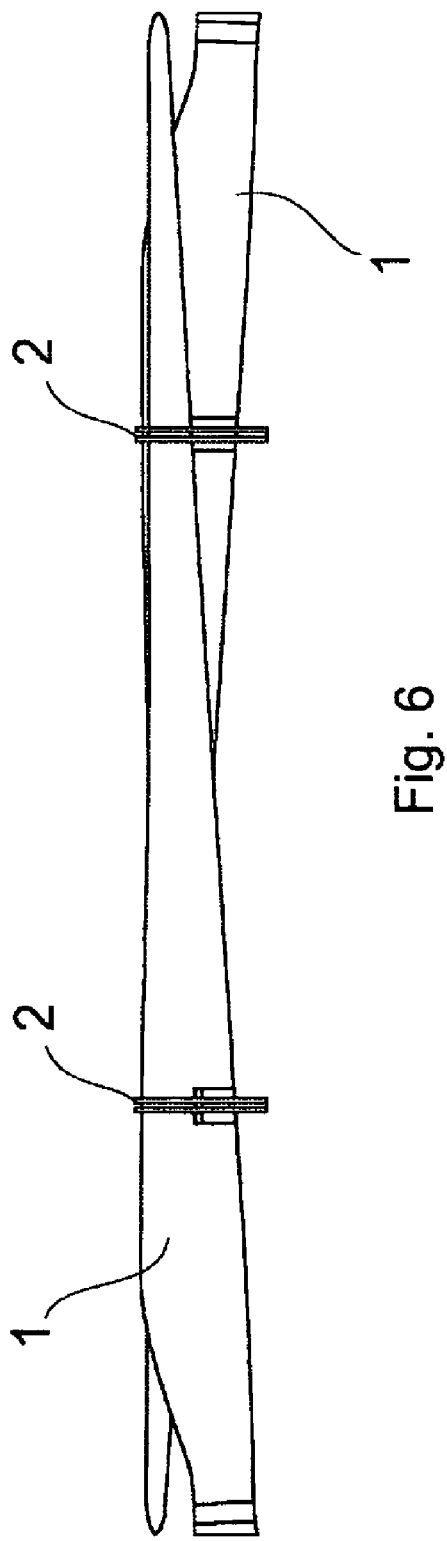
FIG. 6—shows a lateral view of the packing structure for logistics without tensioning devices.
Figure 7:
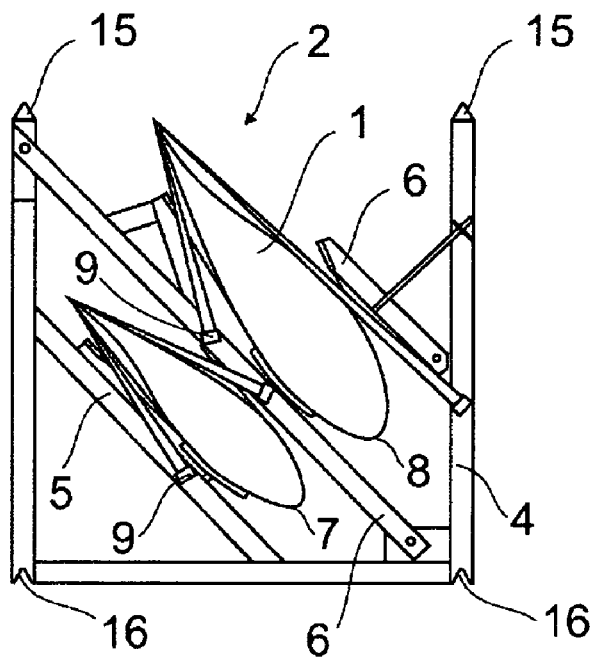
FIG. 7—shows a frontal view of the packing structure for logistics and the mortise of two blades.
Figure 8:
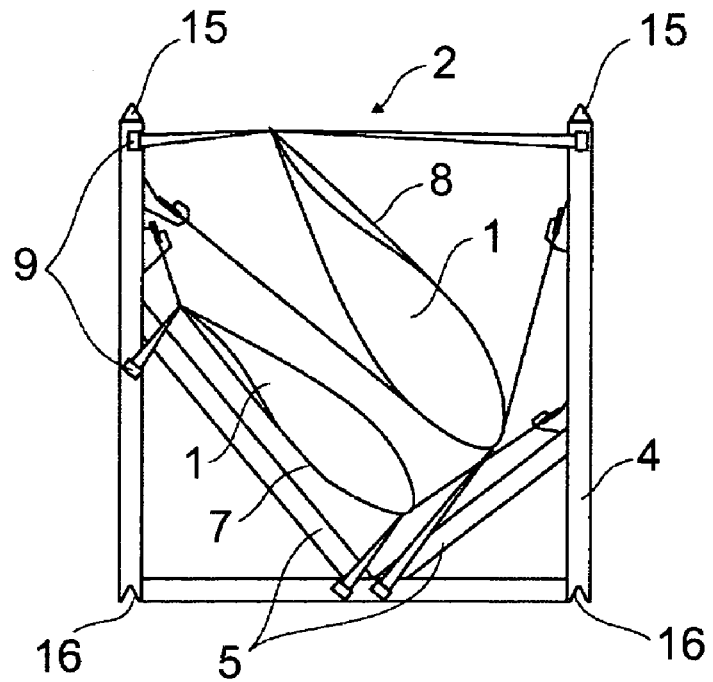
FIG. 8—shows a frontal view of an alternative packing structure for logistics and the mortise of two blades.

The present invention consists of a packing device for logistics, which may include steps such as handling, transporting and storing, of groups of wind turbine rotor blades (1), preferably of pairs of wind turbine rotor blades (1). The packing device for logistics of wind turbine rotor blades (1) comprises at least two structures (2), each one having one peripheral frame (4), as shown in FIGS. 5, 7 and 8. In FIG. 7 it is shown the mortise of two blades to the structure and in FIG. 8 it is shown the mortise of two blades to an alternative structure according to another embodiment of the present invention.

In the inner part of the structure (2) is a set of anchor arms (5) and (6), being preferably at least one of said anchor arms (5) fixed and the others anchor arms (6) removable or rotatable on peripheral frame (4), as shown in FIGS. 5, 7 and 8. The number and the geometry of anchor arms (5) and (6) are determined according to the blades (1) geometry and according to the needed resistance to assure the blades (1) integrity and complying with international transportation regulations.

To the inner part of each frame (4) are attached the tips of the flexible belts (7) and (8) to at least two different points of the structure (2). The flexible belts (7) and (8) can be attached either to the frame (4) or to the anchor arms (5) and (6). Additionally, the flexible belts (7) and (8) envelop the blades (1) profile partially or entirely, supporting the weight and guaranteeing the immobilization.

The configuration with flexible belts (7) and (8) envelop the blades (1) profile partially is illustrated in FIG. 7, and alternatively the configuration with flexible belts (7) and (8) envelop the blades (1) profile entirely is illustrated in FIG. 8. In the configuration with flexible belts (7) and (8) enveloping the blades (1) profile entirely, the flexible belts (7) and (8) can also be used for individual handling of the blades. The flexible belts (7) and (8) are stressed by ratchets (9) which allow the proper control of the force applied to the blades (1) by said flexible belts (7) and (8). The composition used for manufacturing such flexible belts (7) and (8) can be textile or another one with the proper elasticity.

Furthermore, according to the described constructive form of the structures (2), the arrangement and fixation of the rotors blades (1) are accomplished by the introduction of both the structures (2) around a group of adjacent, longitudinally aligned blades (1) being said group of blades (1) preferably a pair of oppositely placed blades, as illustrated in FIGS. 6, 9, 10 and 11, with the tip of one blade beside the root of the other.

Figure 9:
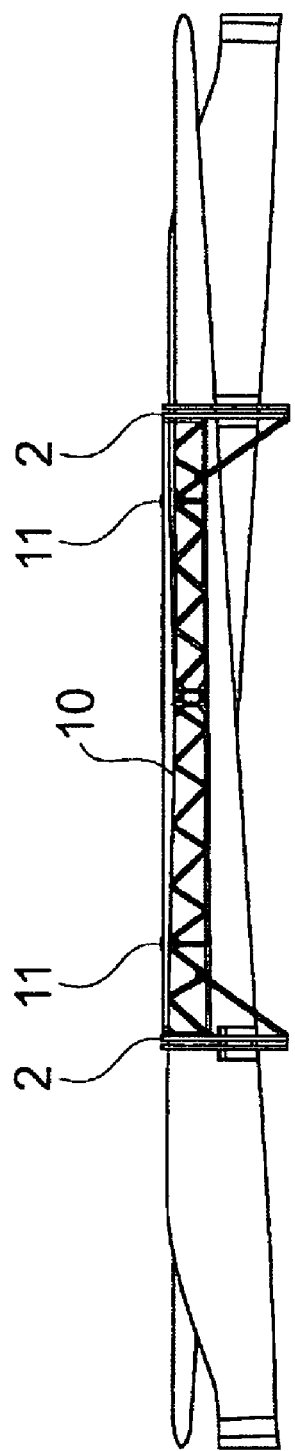
FIG. 9—shows a lateral view of the packing structure for logistics with middle structure without tensioning devices.
Figure 10:
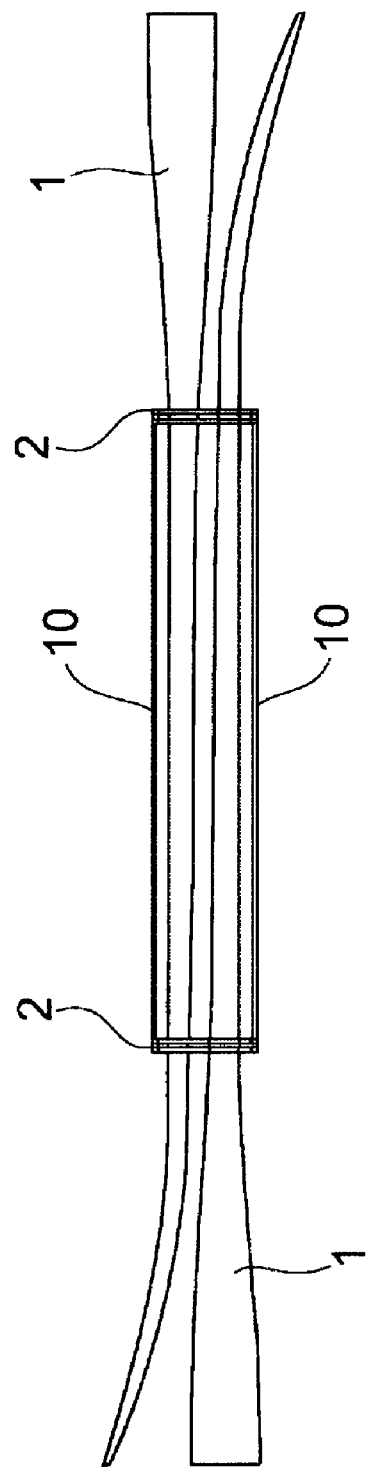
FIG. 10—shows a top view of the packing structure for logistics with middle structure without tensioning belts.

Between the structures (2) a middle structure (10) can be placed, being said middle structure (10), preferably fixed to the structures (2). The middle structure (10) connects the structures (2), allowing the support of the blades (1) on the gravity center and providing proper handling points (11) for the use of standard transportation equipments, as illustrated in FIGS. 9 and 10. In this configuration, for example, conventional cranes, such as the ones found in ports, can be used to handle the pair of blades (1). Additionally, on areas where can be contact between the two blades, are placed protecting devices (12), for example, of fiber glass, that prevent the friction between the blades (1). Alternatively, said protecting devices (12) may consist on inflatable elements disposed in such a way to provide the proper fixation and protection to the blades (1) during handling, transporting and storing.

Figure 11:
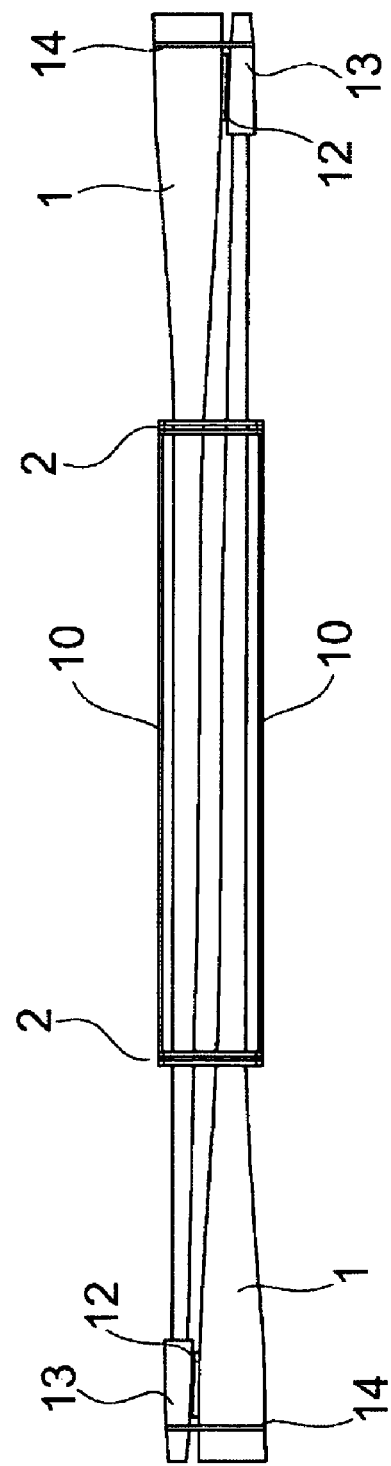
FIG. 11—shows a top view of the packing structure for logistics with middle structure and with tensioning belts.

Alternatively, the proper blade (1) fixation may be achieved by using tip protection cover (13), enveloping the entire blade (1) tip, for example, of fiber glass or another polymer; blades fastening device (14), such as belts, ropes or chains; and protecting devices (12) on areas of contact between the two blades, as illustrated in FIG. 11. The tensioning devices (14) induce a light deformation of the arched blade (1) tip, using the flexibility of the blade (1) tip to improve the fixation.

Furthermore, on areas, where can be contact between the two blades, are placed protecting devices (12), for example, of fiber glass, that prevent the friction between the blades (1). Alternatively, said protecting devices (12) may consist on inflatable elements disposed in such a way to provide the proper fixation and protection to the blades (1) during handling, transporting and storing.

On the borders of the structures (2) are placed upper guides (15) and under guides (16), being the shapes of said upper guides (15) complementary to the shape of said under guides (16), as illustrated in FIGS. 5, 7 and 8, and being under guides (16) of a set of structures (2) of a first group of blades (1) matched to upper guides (15) of a set of structures (2) of another group of blades (1) facilitating the stowage operation. During the operation of stacking the structures (2), the under guides (16) slid on the upper guides (15), facilitating the overlapping of structures.

INDUSTRIAL APPLICABILITY

The set of structures for handling, transporting and storing disclosed can be reproduced in any kind of industry that is equipped with the proper technology for producing strong and reliable frame structures and also the proper technology for producing belts, ropes or chains, and protecting devices that maintain the desired position of the blades without causing any damage to the blades, both associated to technologies of wind turbine rotor blades.

The invention claimed is:

1. A packing device for transport of wind rotor blades, the packing device comprising:
   at least two structures, each of the structures comprising:
      a peripheral frame,
      at least one first anchor arm which is fixed to the peripheral frame and which is configured to support at least a first wind rotor blade, and
      at least one second anchor arm which is removeably or rotatably attached to the peripheral frame and which is configured to support at least a second wind rotor blade, different from the first wind rotor blade.

2. The packing device according to claim 1, wherein each of the structures further comprises:
   at plurality of flexible belts which are configured to entirely wrap around the first wind rotor blade and the second wind rotor blade and which fasten each of the first wind rotor blade and the second wind rotor blade to the at least one first anchor arm and the at least one second anchor arm.

3. The packing device according to claim 1, wherein each of the structures further comprises:
   a plurality of flexible belts which fasten the first wind rotor blade and the second wind rotor blade to the at least one first anchor arm and the at least one second anchor arm.

4. The packing device according to claim 3 or claim 2, wherein each of the structures further comprises a plurality of ratchets, wherein each of the ratchets attaches one of the flexible belts to the structure, such that a tension of each of the flexible belts is adjustable by one of the ratchets.

5. The packing device according to claim 1, wherein the at least two structures comprises a first structure and a second structure, the device further comprising:
   a middle structure which connects the first structure to the second structure, the middle structure comprising handling points positioned on the middle structure in accordance with specifications of standard transportation equipment.

6. The packing device according to claim 1, wherein each of the structures further comprises:
   upper guides disposed at an upper side of the structure and under guides disposed on a lower side of the structure, wherein the shape of the upper guides is complementary to the shape of the under guides, such that one pair of the structures may be stacked on another pair of the structures such that the upper guides and under guides fit together.

7. The packing device according to claim 1, further comprising:
   a tip protection cover structured to fit over a tip of one of the first wind rotor blade and the second wind rotor blade, a blades fastening device comprising one or more belts, ropes, and chains, and one or more protecting devices which are disposed between and protect the first wind rotor blade and the second wind rotor blade.

8. The packing device according to claim 7, wherein the tip protection cover is inflatable.

9. The packing device according to claim 7, wherein the tip protection cover is composed of a polymer.

10. The packing device according to claim 7, wherein the protecting devices are inflatable.

11. The packing device according to claim 7, wherein the protecting devices are composed of a polymer.

12. A packing device for securing a first wind rotor blade and a second wind rotor blade for transport, the device comprising:
   a first structure and a second structure, each of the structures comprising:
      a peripheral U-shaped frame;
      at least one fixed anchor arm comprising a first end and a second end both fixed to the frame; and
      at least one moveable anchor arm comprising a first end rotatably attached to the frame and a second end which is not attached to the frame,
   wherein the fixed anchor arm of the first structure and the fixed anchor arm of the second structure are configured to together support the first wind rotor blade, and the moveable anchor arm of the first structure and the moveable anchor arm of the second structure are configured to together support the second wind rotor blade.

* * * * *